(12) United States Patent
Agrawal et al.

(10) Patent No.: US 6,763,350 B2
(45) Date of Patent: Jul. 13, 2004

(54) SYSTEM AND METHOD FOR GENERATING HORIZONTAL VIEW FOR SQL QUERIES TO VERTICAL DATABASE

(75) Inventors: Rakesh Agrawal, San Jose, CA (US); Amit Somani, San Jose, CA (US); Yirong Xu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 09/872,385

(22) Filed: Jun. 1, 2001

(65) Prior Publication Data

US 2003/0110189 A1 Jun. 12, 2003

(51) Int. Cl.[7] .............................................. G06F 17/30
(52) U.S. Cl. ........................... 707/3; 707/100; 707/102
(58) Field of Search ........................ 707/2–4, 100–102

(56) References Cited

U.S. PATENT DOCUMENTS

| | | | | |
|---|---|---|---|---|
| 5,794,228 A | | 8/1998 | French et al. ................ | 707/2 |
| 5,794,229 A | * | 8/1998 | French et al. ................ | 707/2 |
| 5,918,225 A | | 6/1999 | White et al. ................. | 707/3 |
| 5,991,754 A | * | 11/1999 | Raitto et al. ................ | 707/2 |
| 6,023,696 A | * | 2/2000 | Osborn et al. ............... | 707/3 |
| 6,298,342 B1 | * | 10/2001 | Graefe et al. ................ | 707/4 |
| 6,339,769 B1 | * | 1/2002 | Cochrane et al. ............. | 707/2 |

OTHER PUBLICATIONS

Publication: "Relational Databases for Querying XML Documents: Limitations and Opportunities". Shanmugasundaram et al. In Proceedings of the 25th Very Large Data Bases, Conference, Sep. 7–10, 1999, Edinburgh, Scotland.

Publication: "A Domain Based Internal Schema For Relational Database Machines". In Proceedings of the 182 ACM SIGMOD International Conference on Management of Data, pp. 215–224. Orlando, Florida, Jun. 2–4, 1082.

Publication: "On Efficiently Implementing SchemaSQL on a SQL Database System", pp. 471–482. In Proceedings of the 25th Very Large Data Bases, Conference, Sep. 7–10, 1999, Edinburgh, Scotland.

Publication: "A Query Processing Strategy For The Decomposed Storage Model". In Proceedings of the Third International Conference on Data Engineering, pp. 636–643. Feb. 3–5, 1987, Los Angeles, California.

Technical Report: "A Performance Evaluation of Alternative Mapping Schemes for Storing SML Data in a Relational Database". D. Florescu et al. INRIA, France, May 1999.

Publication: "Storing Semistructure Data with STORED", pp. 431–442. A. Deutsch et al. In SIGMOD 1999, Proceedings ACM SIGMOD International Conference on Management of Data, Jun. 1–3, 1999, Philadelphia, Pennsylvania.

Publication: "A Decomposition Storage Model", pp. 268–279. G. Copeland et al. In Proceedings of the 1985 ACM SIGMOD International Conference on Management of Data, Austin, Texas, May 28–31, 1985.

Publication: "MIL Primitives For Querying A Fragmented World", pp. 1–20, P. Boncz et al. VLDB Journal, 8(2), Oct., 1999.

* cited by examiner

*Primary Examiner*—Wayne Amsbury
*Assistant Examiner*—CamLinh Nguyen
(74) *Attorney, Agent, or Firm*—John L. Rogitz

(57) ABSTRACT

A database including vertical tables useful for storing large numbers of objects having potentially thousands of attributes in, e.g., e-commerce applications. To support querying the vertical database using conventional SQL, a horizontal view over the underlying vertical tables is defined, and then queries are posed against the view. The queries are automatically transformed and executed against the vertical tables. If desired, the query results can be transformed back to a horizontal format. In this way, it appears to the user that a conventional horizontal data format is being used.

14 Claims, 1 Drawing Sheet

OVERALL LOGIC

ARCHITECTURE

OVERALL LOGIC

SYSTEM AND METHOD FOR GENERATING HORIZONTAL VIEW FOR SQL QUERIES TO VERTICAL DATABASE

BACKGROUND OF THE INVENTION

1. Field of the Invention

The present invention relates to databases.

2. Description of the Related Art

Relational database management systems (RDBMS) have become the repository of choice for data, owing to the ease with which data can be extracted in response to a particular user-generated query. The query language typically used in extracting data from RDBMS is SQL, the properties of which advantageously simplify the data retrieval.

SQL has been designed under the assumption that RDBMS will store data horizontally, that is, in tables in which each row represents an object, also referred to as a tuple, and each column represents an attribute of the tuple. To obtain data as desired from the database, an SQL query is generated, optimized automatically by the RDBMS, and then executed, typically by joining two or more tables using join predicates, with the sought-after data being returned to the user.

As understood by the present invention, while conventional RDBMS that use horizontal tables are effective for many of their intended purposes, in certain emerging applications, notably e-commerce, the horizontal scheme can be inadequate for several reasons. For instance, an e-marketplace for electronics might require a database storing data on parts from 1000 manufacturers and distributors, and might contain two million parts classified into 2000 categories. New suppliers might join the marketplace on a regular basis, meaning that the database must constantly evolve. Unfortunately, horizontal databases are typically limited in the number of columns that are allowed, e.g., to 1012 columns, but as recognized herein e-marketplaces such as the one postulated above might require 5000 or more attributes spread across different categories and, hence 5000 or more columns. Even if a horizontal database were expanded to allow many more columns, most of the database fields would have nulls in them (thus rendering a "sparse" database), since most parts would have far fewer than the maximum number of possible attributes. As understood herein, in addition to increasing storage overhead, nulls increase the size of the database index and are preferentially highly sorted in many RDBMS tree indices, despite the fact that nulls convey no meaningful information. Such "sparsity" also degrades performance when data records are very wide in terms of the number of columns but only a few columns are required for a query. Further, using a horizontal system in the above-postulated scenario, the present invention recognizes that the parts table would require frequent and expensive altering to accommodate new parts and categories.

Accordingly, the present invention has understood that a different data representation is indicated, and more specifically, that a ternary (3-column) "vertical" representation is better suited to applications such as the e-commerce application discussed above. In a ternary vertical table, only a few columns, e.g., three, are used, with the first column representing an object identification and two more columns representing attribute names and attribute values, respectively, for the objects. Thus, the vertical table contains no nulls. Schema evolution becomes trivial, since as new objects (e.g., electronic parts) are added to the marketplace, new tuples are added to the vertical tables.

As recognized herein, however, storing data in vertical format raises complications. First, recall that SQL is designed for horizontal storage formats, and as a consequence writing SQL queries against vertical tables requires a level of expertise in SQL not possessed by most users. Even in the hands of an expert, tailoring an SQL query for a vertical table is cumbersome and error-prone. Additionally, current application development tools are designed for horizontal data formats; they simply will not function when used in connection with vertical tables.

The present invention has recognized the above-noted problems and provides solutions to one or more of them as disclosed below.

SUMMARY OF THE INVENTION

To address one or more of the above-noted problems, a logical horizontal view is provided on top of an underlying vertical database, with the user, e.g., a person or an application development tool, writing conventional SQL queries against the logical horizontal view and with the queries then being translated transparently to the user for execution against the underlying vertical tables.

A general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer is coupled to a relational database system that is characterized by at least one vertical table. The computer logic defines a logical horizontal view over the vertical table, and receives at least one SQL query against the horizontal view. The query is transformed to render a transformed query, with the transformed query being executed against the vertical table to generate an output.

In a preferred embodiment, the query is transformed using at least one operator that receives the vertical table and outputs the logical horizontal table having column labels equal to the attribute names in the vertical table. As set forth further below, the operator is a v2h operator. More particularly, the preferred operator executes a left outer join of a projection of the object identifications of the vertical table with a summation left outer join of a projection of attribute values from the vertical table.

The query transformation can include any standard relational operator such as executing a projection based on the vertical table, or a selection from the vertical table, or a table join using the vertical table, or a cross product, union, or intersection. Also, the transforming act can include executing the operator on the vertical table to render a result and then undertaking a desired set operation on the result. As intimated above, a horizontal to vertical operator can be executed against the output to transform the output to a vertical format.

In another aspect, a computer program device includes a computer program storage device that is readable by a digital processing apparatus. A program is on the program storage device. The program includes instructions that can be executed by the digital processing apparatus for querying a vertical table in a database system. The program includes computer readable code means for transforming a horizontal-based SQL query into a transformed query that has a format for execution against the vertical table.

In yet another aspect, a method for extracting data from a vertical table in a database includes defining an enablement layer which includes a horizontal view representative of the vertical table. The method also includes extracting data from the database based on an SQL query using the enablement layer, without requiring a user to tailor the query to a vertical format.

DETAILED DESCRIPTION OF THE PREFERRED EMBODIMENTS

Figure 1:
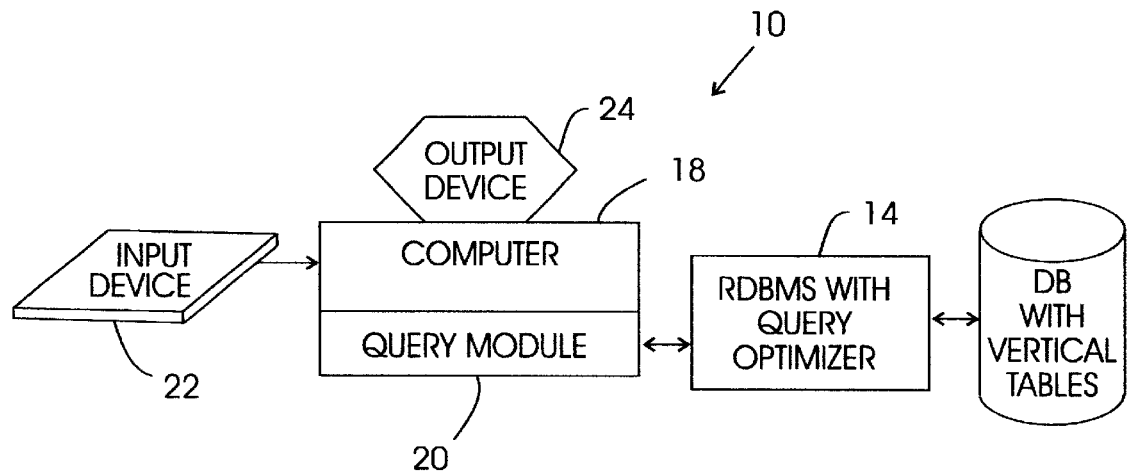
FIG. 1 is a schematic diagram showing the system of the present invention.

Referring initially to FIG. 1, a system is shown, generally designated 10, for querying a relational database system by selecting categories of data. The database system includes a database 12 and an associated database management system (DBMS) 14. In one non-limiting embodiment, the database system can be a DB2 Universal Database version 7.1 system made by the present assignee, it being understood that the principles advanced herein apply to other database systems as well. In any case, the database 12 stores at least some data in vertical tables, i.e., in a preferred embodiment tables that have a first column representing object identifications and second and third columns representing attribute names and attribute values, respectively.

A user such as a person or application development tool can use a computer 18 to execute a query module 20 (stored locally at the computer 18 or remotely therefrom) to effect the inventive logic herein. The database 12 may reside, for example, in a Web server or other location remote from the user computer 18 and be accessible via a wide area network, such as but not limited to the Internet.

In one intended embodiment, the computer 18 may be a personal computer made by International Business Machines Corporation (IBM) of Armonk, N.Y., including a 600 MHz Intel Pentium® processor with 512 megabytes of memory running Windows NT 4.0 operating system with two 30 gigabyte IDE hard drives, a buffer pool size set to 50 megabytes, and a prefetch size set to 512 kilobytes. Or, the computer 18 may be any computer, including computers sold under trademarks such as AS400, with accompanying IBM Network Stations. Or, the computer 18 may be a Unix computer, or OS/2 server, or Windows NT server, or IBM RS/6000 250 workstation or an IBM laptop computer.

As shown in FIG. 1, the computer 18 is electrically connected to one or more input devices 22, e.g., a mouse or keyboard, which can be manipulated by a user of the system 10 to undertake the logic below. The results of the application execution can be output via an output device 24 such as a printer or monitor or other computer or computer network that is conventionally coupled to the computer 18.

With the above overview of the present architecture In mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor within the computer 18 as a series of computer-executable instructions. These instructions may reside, for example, in RAM of the computer 18 or on a hard drive or optical drive of the computer 18, or the instructions may be stored on a DASD array, magnetic tape, electronic read-only memory, or other appropriate data storage device. In an illustrative embodiment of the invention, the computer-executable instructions may be lines of compiled C++ compatible code.

Figure 2:
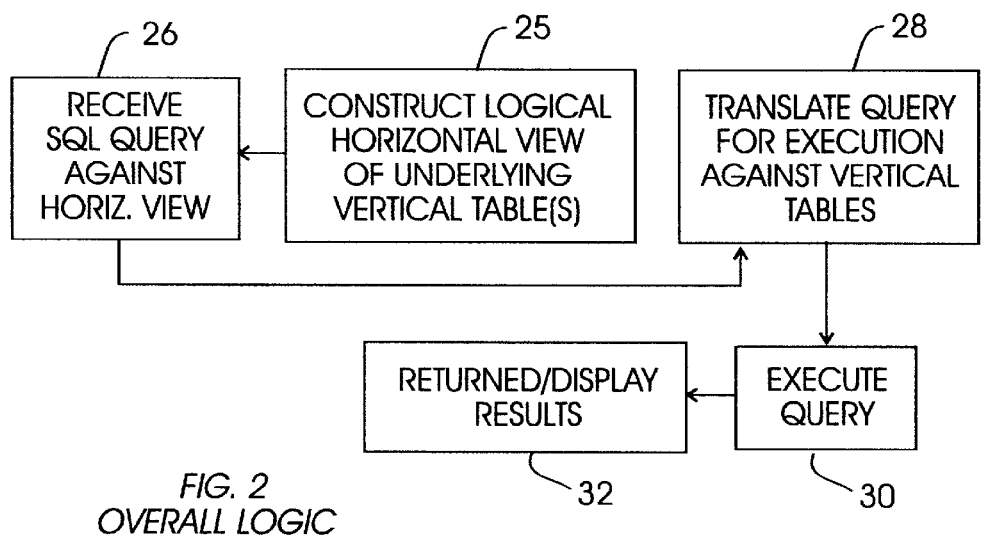
FIG. 2 is a flow chart of the overall logic.

Now referring to FIG. 2, the overall logic of the present invention can be seen. Commencing at block 25, a logical horizontal view of the vertical table or tables in the database 12 is created as set forth more fully below. This horizontal view can be thought of as an enablement layer representative of the vertical table. Moving to block 26, a user accesses the logical horizontal view and inputs a conventional SQL query, that is, the user inputs an SQL query in a format suitable for querying a horizontal database. Accordingly, using the enablement layer, data can be extracted from the database based on an SQL query without requiring a user to tailor the query to a vertical format.

This is because, proceeding to block 28, the query is automatically translated by the query module 20 into a format that is appropriate for execution against the actual vertical table or tables underlying the horizontal view, in accordance with the disclosure below. The query is then executed against the vertical table at block 30, and query results are returned and, if desired, displayed at block 32. As set forth in greater detail below, the results can be transformed back into a horizontal format, so that to the user, the underlying vertical storage of data is transparent, and the DBMS 14 appears to be a horizontal DBMS.

The above overall logic can be better understood by the additional disclosure that follows.

TABLE 1

| Horizontal (H) | | | |
|---|---|---|---|
| Oid | A1 | A2 | A3 |
| 1 | a | b | ⊥ |
| 2 | ⊥ | c | d |
| 3 | ⊥ | ⊥ | a |
| 4 | b | ⊥ | d |

| Vertical (V) | | |
|---|---|---|
| Oid | Key | Val |
| 1 | A1 | a |
| 1 | A2 | b |
| 2 | A2 | c |
| 2 | A3 | d |
| 3 | A3 | a |
| 4 | A1 | b |
| 4 | A3 | d |

We start with the well-understood algebraic operations: select($\sigma$), project($\pi$), join($\bowtie$), outer join ($\supset\!\!\!\bowtie\!\!\!\subset$), left outer join ($\supset\!\!\!\bowtie$), right outer join ($\bowtie\!\!\!\subset$), cross product ($\chi$), union ($\cup$), intersection ($\cap$), difference ($-$), and aggregation (F). We add two operations to this algebra: v2h($\Omega$) and h2v($\mho$). We define the semantics of these operations after briefly introducing a few notations.

Notation Assume that the vertical table V has the scheme (Oid, Key, Val) with a non-nullable column Oid and that A1, . . . , An are the key values in V. The equivalent horizontal table H has the scheme (Oid, A1, . . . , An) with the column Oid being non-nullable. We use Ak+m to represent the $(k+m)^{th}$ attribute. The symbol ⊥ represents a null value.

We will use $\Theta_{i=1}^{k}\psi_i$ as a short hand for $\psi_1\theta\psi_2 \ldots \theta\psi_k$. For a join opera (including its outer species), unless otherwise stated, assume the join predicate to be the equality of Oid. An explicit join predicate $\psi$ will be specified as $\bowtie_\psi$.

Sometimes we will use S0, S1, etc. to refer to the columns of a result table.

For visual clarity, we will sometimes add square brackets in an expression as shown below.

$$[\Psi_0]\theta[\Theta_{i-1}^k \Psi_i]$$

These square brackets do not affect the order of evaluation in any way; they are there only to enhance readability.

v2h

Operation Intuitively, the v2h($\Omega$) operation takes as input a vertical table and a list of attribute names and returns a horizontal table with those attribute names as the column labels.

$\Omega^k(V)$ creates a horizontal table of arity k+1 whose first column is Oid and the first k key values form the rest of the k columns. The content of the table is defined by:

$$\Omega^k(V) = [\pi_{Oid}(V)] \bowtie [\bowtie_{i=1}^k \pi_{Oid, Val}(\sigma_{Key='Ai'}(V))] \quad (1)$$

Because of the first term on the right hand side and the use of left outer join, Eq. 1 can yield tuples with nulls in all of the non-Oid columns. For example, $\Omega^2$ applied to a vertical table V (Table 1) results in the table shown in Table 2. For Oid=3, V does not contain tuples corresponding to key values A1 and A2. However, the result table contains a tuple with this Oid and null values for attributes A1 and A2.

$$\Omega^k(V) = \bowtie_{i=1}^k \pi_{Oid, Val}((\sigma_{Key='Ai'}(V)) \quad (2)$$

h2v Operation

The h2v($\mho$) operation is the inverse of the v2h operation. Intuitively, it takes as input a horizontal table and converts it into a vertical table where each column label in the horizontal table is converted to a key value in the vertical table.

Assume a horizontal table H having the scheme (Oid, A1, ..., An) with the column Oid being nonnullable. $\mho^k(H)$ creates a vertical table with the scheme (Oid, Key, Val). The content of V is defined by:

$$\mho_k(H) = [\cup_{i=1}^k \pi_{Oid, 'Ai', Ai}(H)] \cup [\cup_{i=1}^k \pi_{Oid, 'Ai', Ai}((\sigma_{\wedge_{i=1}^k Ai='\bot'})] \quad (3)$$

For each tuple h in H, the first term in Eq. 3 creates the tuples {<Oid, 'Ai', h.Ai>|i=1, ..., n∧h.Ai≠⊥}. The second term is needed to maintain the equivalence of the horizontal and vertical representations. It handles the special case of a horizontal tuple that has null values in all of the non-Oid columns. Table 3 shows the result of applying $\mho^2$ to the horizontal table H from Table 1.

Rewritings

We describe now the rewritings of the standard algebraic operations on the horizontal view over a vertical table. We

TABLE 2

| (I) | (II) | (III) $\Omega^2(V)$ | (IV) | | (Result) | | |
|---|---|---|---|---|---|---|---|
| Oid | Oid \| Val | Oid \| Val | $0 \| $1 | | $0 | $1 | $2 |
| 1 | 1 \| a | 1 \| b | 1 \| a | | 1 | a | b |
| 2 | 4 \| b | 2 \| c | 2 \| ⊥ | | 2 | ⊥ | c |
| 3 | $\pi_{Oid, Val}(\sigma_{Key='A1'}(V))$ | $\pi_{Oid, Val}(\sigma_{Key='A2'}(V))$ | 3 \| ⊥ | | 3 | ⊥ | ⊥ |
| 4 | | | 4 \| b | | 4 | b | ⊥ |
| $\pi_{Oid}(V)$ | | | (I) ⋈ (II) | | (IV) ⋈ (III) | | |

This semantics is consistent with the null handling in SQL. For instance, a projection of the horizontal table in Table 1 on attributes A1 and A2 will indeed preserve the tuple corresponding to Oid=3 in SQL. If it were desired that the v2h operation does not create such tuples, Eq. 1 can be modified to:

give two forms of rewritings: one with and, the other without using the v2h operation. The former can be used on a SQL-92 system whereas the latter can exploit the implementation of v2h operation using the object-relational extensions.

TABLE 3

$\mho^2(H)$

| (I) | | | (II) | | | (III) | | | (IV) | | | (Result) | | |
|---|---|---|---|---|---|---|---|---|---|---|---|---|---|---|
| $0 | $1 | $2 | $0 | $1 | $2 | $0 | $1 | $2 | $0 | $1 | $2 | 1 | A1 | a |
| 1 | A1 | a | 1 | A1 | b | 3 | A1 | ⊥ | 3 | A2 | ⊥ | 1 | A2 | b |
| 4 | A1 | b | 2 | A2 | c | $\pi_{Oid,'A1',A1}$ | | | $\pi_{Oid,'A2',A2}$ | | | 2 | A2 | c |
| $\pi_{Oid,'A1',A1}(H)$ | | | $\pi_{Oid,'A2',A2}(H)$ | | | $(\sigma_{A1='\bot' \wedge A2='\bot'}(H))$ | | | $(\sigma_{A1='\bot' \wedge A2='\bot'}(H))$ | | | 3 | A1 | ⊥ |
| | | | | | | | | | | | | 3 | A2 | ⊥ |
| | | | | | | | | | | | | 4 | A1 | b |

(I)∪(II)
∪(III)∪(IV)

Projection

Let the projection be on attributes A1, ..., Ak. We have, from the definition of the v2h operation:

$$\pi_{A1,\ldots,Ak}(H) = \Omega^k(V) \quad (4)$$

$$= [\pi_{Oid}(V)] \bowtie [\bowtie_{i=1}^{k} \pi_{Oid,Val}(\sigma_{Key='Ai'}(V))] \quad (5)$$

Selection

We discuss the usual case of a selection followed by projection. Let the selection predicate be $\Lambda_{i=1}^{k}(Ai\theta\text{'ai'})$ and the projection be on the first k+m attributes, m≥0. Table 4 gives an example of this transformation.

$$\pi_{A1,\ldots,Ak+m}\left(\sigma_{\Lambda_{i=1}^{k} Ai\theta'ai'}(H)\right) = \pi_{A1,\ldots,Ak+m}\left(\sigma_{\Lambda_{i=1}^{k} Ai\theta'ai'}(\Omega^{k+m}(V))\right) \quad (6)$$

$$= \pi_{\$1,\ldots,\$k+m}\left(\left[\bigcap_{i=1}^{k} \pi_{Oid}(\sigma_{Key='Ai' \wedge Val\theta'ai'}(V))\right]\right. \quad (7)$$

$$\left. \bowtie [\bowtie_{i=1}^{k+m} \pi_{Oid,Val}(\sigma_{Key='Ai'}(V))]\right)$$

A disjunctive selection $$\pi_{A1,\ldots,Ak+m}((\sigma_{V_{i=1}^{k} Ai\theta'ai'}(H)$$

can be transformed by simply replacing the intersection $\cap_{i=1}^{k}$ in Eq. 7 with the union $\cup_{i=1}^{k}$.

Join

Take a horizontal table H having the scheme (Oid, A1, ..., An) which is really a logical view over a vertical table V. Its join with a true horizontal table RH having the scheme (R1, ..., Rr) is given by:

$$\pi_{A1,\ldots,Ak,Rk+1,\ldots,Rk+m}\left(H \bowtie_{\Lambda_{i=1}^{k} Ai\theta Ri} RH\right) = \quad (8)$$

$$\pi_{A1,\ldots,Ak,Rk+1,\ldots,Rk+m}\left(\Omega^k(V) \bowtie_{\Lambda_{i=1}^{k} Ai\theta Ri} [RH]\right) =$$

$$\pi_{\$1,\ldots,\$k,Rk+1,\ldots,Rk+m}\left([\bowtie_{i+1}^{k} \pi_{Oid,Val}(\sigma_{Key='Ai'}(V))] \bowtie_{\Lambda_{i=1}^{k} \$i=Ri} [RH]\right) \quad (9)$$

Table 5 illustrates this transformation.

TABLE 4

$\pi_{A2,A3}(\sigma_{A1='a' \wedge A2='b'}(H)) = \pi_{A2,A3}([\pi Oid((\sigma Key='A1' \wedge Val='a'\ (V)) \cap \sigma_{Key='A2' \wedge Val='b'}(V)))] \bowtie [\pi_{Oid,Val}(\sigma_{Key='A1'}\ (V))] \bowtie [\pi_{Oid,Val}(\sigma_{Key='A2'}(V) [\pi_{Oid,Val}(\sigma_{Key='A3'}(V))])$

| (I) | (II) | (III) | | (IV) | | (V) | |
|---|---|---|---|---|---|---|---|
| Oid | Oid | Oid | Val | Oid | Val | Oid | Val |
| 1 | 1 | 1 | a | 1 | b | 2 | d |
| $\pi_{Oid}$ | $\pi_{Oid}$ | 4 | b | 2 | c | 3 | a |
| $\sigma_{Key='A1' \wedge Val='a'}(V)$ | $\sigma_{Key='A2' \wedge Val='b'}(V)$ | $\pi_{Oid,Val}$ | | $\pi_{Oid,Val}$ | | 4 | d |
| | | $\sigma_{Key='A1'}(V)$ | | $\sigma_{Key='A2'}(V)$ | | $\pi_{Oid,Val}$ | |
| | | | | | | $\sigma_{Key='A3'}(V)$ | |

| (VI) | (VII) | | (VIII) | | (IX) | | | (X) | |
|---|---|---|---|---|---|---|---|---|---|
| Oid | $0 | $1 | $0 | $1 | $0 | $1 | $2 | $0 | $1 |
| 1 | 1 | a | 1 | a | 1 | a | b | b | ⊥ |
| 1 | | | | | | | | | |
| (I) ∩ (II) | (VI) ⋈ (III) | | (VII) ⋈ (IV) | | (VIII) ⋈ (V) | | | $\pi_{\$2,\$3}$ (IX) | |

TABLE 5

$\pi_{A1, A2, R3}(H \bowtie_{A1=R1 \wedge A2=R2} RH) = \pi_{\$1, \$2, \$3}([\pi_{Oid, Val}(\sigma_{Key='A1'}(V)) \bowtie_{Oid = Oid} \pi_{Oid, Val}(\sigma_{Key='A2'}(V))][RH])$
$\bowtie_{\$1=R1 \wedge \$2=R2}$ (I)

| Oid | Val |
|-----|-----|
| 1   | a   |
| 4   | b   |

$\pi_{Oid, Val}(\sigma_{Key='A1'}(V))$ (II)

| Oid | Val |
|-----|-----|
| 1   | b   |
| 2   | c   |

$\pi_{Oid, Val}(\sigma_{Key='A2'}(V))$ (III)

| $0 | $1 | $2 |
|----|----|----|
| 1  | a  | b  |

(I) ⋈ (II)

(IV)

| R1 | R2 | R3 |
|----|----|----|
| a  | ⊥  | e  |
| ⊥  | b  | f  |
| a  | b  | g  |

RH (V)

| $0 | $1 | $2 | $3 |
|----|----|----|----|
| 1  | a  | b  | g  |

(III) ⋈ (IV)
$1 = R1 = $2 = R2$ (VI)

| $0 | $1 | $2 |
|----|----|----|
| a  | b  | g  |

$\pi_{\$1, \$2, \$3}(V)$

---

Aggregation We use the following notation to specify aggregation:

Grouping attributes$^F$ Function list$^{(Table\ name)}$

Function list consists of (function, attribute) pairs, where function can be one of the allowed aggregate functions such as SUM, COUNT, AVG, MAX, and MIN. The transformations are:

$$_{A1,...,Ak}F_{F\ Ak+1}(H) = {}_{A1,...,Ak}F_{F\ Ak+1}(\Omega^k(V)) \quad (10)$$

$$= {}_{\$1,...,\$k}F_{F\ \$k+1}(([\pi_{Oid}(V)] \bowtie \quad (11)$$
$$[\bowtie_{i=1}^{k} \pi_{Oid,Val}(\sigma_{Key='Ai'}(V))]$$

For aggregate functions, SUM, MIN, and MAX, which are unaffected by null values in the column being aggregated, Eq. 11 can be simplified to:

$$_{A1,...,Ak}F_{F\ Ak+1}(H) = {}_{\$1,...,\$k}F_{F\ \$k+1}(\bowtie_{i=1}^{k} \pi_{Oid,\ Val}(\sigma_{Key='Ai'}(V)))$$

Set Operations

The set operations cross product(X), union(∪), intersection(∩), and difference(−) can be transformed by first applying the v2h operation on the vertical table(s) and then carrying out the desired operation.

Updates

Updates are easy. Insertion requires decomposing a data object into a set of attribute name and value pairs and inserting them into V with a common Oid. A predicate-based deletion requires determining the Oid set of objects satisfying the predicate and deleting the corresponding tuples from V. An update results in a change of the value field in some tuples in V. It can also cause some insertions and deletions.

Output

There may be need for transforming the result of an operation involving a vertical table back into the vertical format (e.g. for storing the result). This can be accomplished by applying the h2v operation on the result table.

Implementation

With the algebra described above in hand, we are in a position to develop a non-intrusive enablement layer on top of the database engine that hides from the user (application) the vertical table. A horizontal view H is defined for the vertical table V using an extended DDL:

CREATE HORIZONTAL VIEW H ON VERTICAL TABLE V USING COLUMNS (A1, A2, . . . , A$_n$)

where $A_{i=1,n}$ represent attribute names (keys) in the vertical table. The DDL is generated by the enablement layer. The user poses regular SQL queries over the view. The enablement layer parses the SQL query, validates it, and transforms it to another SQL query that runs against the underlying vertical table. It uses a query graph structure to facilitate this translation.

We consider two transformation strategies.

VerticalSQL

This implementation assumes only the SQL-92 level capabilities from the underlying database engine. Above has been two equations for each of the algebraic ops. For this implementation, the enablement layer uses the latter set of equations to generate SQL translations. For example, the projection query:

SELECT A1, A2 FROM H is translated into:

---

SELECT t.Attr1, t.Attr2 FROM
    (SELECT t4.*Oid*, t4.Attr1, t6.Attr2 FROM
        (SELECT t0.*Oid*, t3.Attr1 FROM
            (SELECT DISTINCT t2.*Oid*FROM V AS t2) AS t0(*Oid*)
            LEFT OUTER JOIN
            (SELECT t1.*Oid*, t1.*Val*FROM V AS t1
            WHERE t1.key = 'A1')
            AS t3(*Oid*, Attr1)
            ON t0.*Oid*= 13.*Oid*
    ) AS t4(*Oid*, Attr1)
    LEFT OUTER JOIN
    (SELECT t5.*Oid*, t5.Val FROM V AS t5 WHERE t5.Key = 'A2') AS
        t6(*Oid*, Attr2)
        ON t4.*Oid*= t6.*Oid*
    ) AS t(*Oid*, Attr1, Attr2)

The above query looks quite complex, but the reader may want to verify that it is a direct SQL manifestation of Eq. 5.

VerticalUDF

This implementation attempts to exploit object-relational extensions to SQL, particularly the user-defined table functions. The underlying engine is extended with the table functions for v2h and h2v operations. The v2h table function reads tuples of vertical table sorted on Oid and outputs a horizontal tuple for each Oid. The h2v table function takes as input column names and a horizontal tuple and splits it into vertical tuples.

The enablement layer uses the first set of equations for translating each of the algebraic operations given above for this implementation. For example, the same projection query:

SELECT A1, A2 FROM H is translated into:

SELECT t.Attr1, t.Attr2

FROM V v, TABLE(v2h(v.Oid, v.Key, v.Val)) AS t(Oid, Attr1, Attr2)

WHERE v.Key='A1' or v.Key='A2'

This query may look awkward to a reader unfamiliar with the table function syntax. The query appears to be a Cartesian product between the vertical relation V and the table function v2h. What happens in effect is that the relevant fields from any qualifying tuple v after applying the select predicates on the V table are passed as parameters into the v2h function, which in turn produces horizontal tuples t from which the fields in the select list are extracted.

The v2h table function requires v tuples to be streamed in the Oid order so that it can buffer the key-value pairs until the Oid changes. At that point, it can output the tuple corresponding to the horizontal view. Unfortunately, the current SQL syntax does not allow the specification of the order in which the tuples should be streamed into a table function and that causes problems. Note that a good plan for the above query will push down the Key predicates on A1 and A2 so as to select only the relevant tuples from the V relation. However, the output of this selection would generate tuples in Key or physical row-id order which is different from the Oid order required for v2h.

A workaround this problem is to introduce a join of the tuple stream produced by the selection with a table of Oid's and cajole the optimizer to pick a merge sort join plan, thereby forcing a sort on Oid. By introducing this join and adjusting the optimization level for the DB2 query optimizer, we could generate the correct plans.

A wild card data type as discussed herein is but one non-limiting data type. Present principles can be applied to other data types such as, without limitation, integers, floats, etc. A separate vertical table can be created for each type. A catalog table could maintain data type information for each attribute, yielding the following scheme:

ATTRIBUTES (KEY CHAR(K) PRIMARY KEY, DATATYPE CHAR(N));
V_INT(OID INTEGER, KEY CHAR(K), VAL INTEGER);
V_FLOAT(OID INTEGER, KEY CHAR(K), VAL FLOAT);
V_VARCHAR(OID INTEGER, KEY CHAR(K), VAL VARCHAR(X));

While the particular SYSTEM AND METHOD FOR GENERATING HORIZONTAL VIEW FOR SQL QUERIES TO VERTICAL DATABASE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A computer system, comprising:
   a general purpose computer coupled to a relational database system characterized by at least one ternary vertical table, the computer including logic for undertaking method acts including:
      defining a logical horizontal view over the vertical table;
      receiving at least one SQL query against the horizontal view;
      transforming the query to render a transformed query; and
      executing the transformed query against the vertical table to generate an output.

2. The system of claim 1, wherein the query is transformed using at least one operator.

3. The system of claim 2, wherein the operator receives at least one vertical table with an associated list of attribute names as input and outputs the logical horizontal table having column labels equal to the attribute names.

4. The system of claim 3, wherein the operator is a v2h operator.

5. The system of claim 3, wherein the vertical table includes object identifications with corresponding attribute names and attribute values, and the operator executes a left outer join of a projection of distinct object identifiers of the vertical table with a sequence of left outer joins of a set of projections of attribute values from the vertical table.

6. The system of claim 5, wherein the transforming act undertaken by the computer includes executing the operator on the vertical table to render a result and then undertaking a desired set operation on the result.

7. The system of claim 1, wherein the transforming act undertaken by the computer includes executing at least one projection based on the vertical table.

8. The system of claim 1, wherein the transforming act undertaken by the computer includes executing at least one selection from the vertical table.

9. The system of claim 1, wherein the transforming act undertaken by the computer includes executing at least one table join using the vertical table.

10. The of claim 1, wherein the transforming act undertaken by the computer includes executing at least one aggregation.

11. The system of claim 1, wherein the method acts undertaken by the computer include executing a horizontal to vertical operator against the output to transform the output to a vertical format.

12. The system of claim 1, wherein the transforming act undertaken by the computer includes executing at least one cross product based on the vertical table.

13. The system of claim 1, wherein the transforming act undertaken by the computer includes executing at least one union based on the vertical table.

14. The system of claim 1, wherein the transforming act undertaken by the computer includes executing at least one intersection based on the vertical table.

* * * * *